US005669689A

United States Patent [19]

Zeifang

[11] Patent Number: 5,669,689

[45] Date of Patent: Sep. 23, 1997

[54] HOLDER FOR TRANSPARENCIES

[75] Inventor: William Joseph Zeifang, Rochester, N.Y.

[73] Assignee: Labelon Corporation, Canandaigua, N.Y.

[21] Appl. No.: 720,776

[22] Filed: Oct. 3, 1996

Related U.S. Application Data

[60] Provisional application No. 60/005,001, Oct. 10, 1995.

[51] Int. Cl.[6] .................................................... G03B 21/11

[52] U.S. Cl. .................................... 353/120; 353/DIG. 3; 353/DIG. 5; 40/707

[58] Field of Search ............................... 353/120, DIG. 3, 353/DIG. 5; 50/701, 702, 710, 773

[56] References Cited

U.S. PATENT DOCUMENTS

| | | | |
|---|---|---|---|
| 3,281,977 | 11/1966 | Koontz | 40/702 |
| 4,402,585 | 9/1983 | Gardlund | 353/120 |
| 5,266,987 | 11/1993 | Kienne et al. | 353/120 |
| 5,319,400 | 6/1994 | Herbert et al. | 353/120 |
| 5,329,324 | 7/1994 | Candido | 353/120 |
| 5,335,027 | 8/1994 | Lin et al. | 353/120 |
| 5,486,883 | 1/1996 | Candido | 353/120 |
| 5,568,210 | 10/1996 | Kiehne et al. | 353/120 |

*Primary Examiner*—William Dowling
*Attorney, Agent, or Firm*—Nixon, Haragrave Devans & Doyle

[57] ABSTRACT

A ring binder holder for transparency sheets comprises an elongated, rectangular ring-engagable strip of sheet material such as plastic or heavy paper having two parallel longitudinal edges. A line of ring-engagable openings in the strip is parallel and adjacent to one of the edges. Along the other edge is a line of adhesive on the strip that is adapted to adhere and attach the strip to an edge of a plastic transparency sheet. An elongated opaque flap is hingedly attached to the strip along a line that extends the entire length of the strip between and parallel to the line of ring-engagable openings and the line of adhesive. The flap is hingedly movable between a closed position covering the adhesive line and an open position covering the ring-engagable openings and the adjacent edge of the strip.

8 Claims, 1 Drawing Sheet

HOLDER FOR TRANSPARENCIES

RELATED APPLICATIONS

This application claims the benefit of Provisional application Ser. No. 60/005,001 filed Oct. 10, 1995.

1. Field of the Invention

This invention relates to a device for holding transparency sheets and more particularly to such a device adapted to hold image-bearing, overhead projection transparency sheets in a ring binder.

2. Background of the Invention

The patent to Gardlund, U.S. Pat. No. 4,402,585, discloses an envelope article for holding overhead projection transparencies. The transparency is entirely enclosed within a transparent envelope and the envelope has an opaque flap hinged along one of its longitudinal edges.

As pointed out in the patent to Herbert et al., U.S. Pat. No. 5,319,400, a disadvantage of the Gardlund article is "that light must pass through three layers of film, including two comprising the envelope and the transparency itself, which affects the brightness and clarity of the projected image. In addition, the envelope/transparency combination results in a somewhat bulky package." As an alternative, the Herbert et al. patent proposes a light-blocking transparency assembly in which opaque flaps are affixed to the transparency film without using an envelope.

A serious drawback of the assembly proposed by the Herbert et al. patent is that the attached flaps pose a problem for automatic feeding of the transparency sheets in office copying machines that are normally used for creating images on overhead projection transparencies. Furthermore, the requirement that all of the transparency sheets have flaps adds undesirably to costs.

BRIEF SUMMARY OF THE INVENTION

In accordance with the present invention, a transparency holder is provided which can be stored in ring binder notebooks and can be attached to a plain transparency sheet after the sheet has been fed through a copying machine for imaging. The novel holder requires no special type of transparency sheets but can be attached, detached, reattached or permanently affixed to plain sheets. Furthermore, the holder overcomes the disadvantage of plural thicknesses of layers as discussed with regard to the Gardlund et al. patent, yet provides the advantages of convenient storage of the transparency in a ring binder notebook and of having an opaque flap for lecture notations and for blocking of undesired light during overhead projection.

The novel device of the invention is a ring binder transparency holder which comprises an elongated, substantially rectangular, ring-engagable strip of sheet material having two longitudinal edges. A line of ring-engagable openings in the strip is parallel and adjacent to one of said edges. Adjacent to the other longitudinal edge is an elongated area of said strip that is adapted to receive an edge of a plastic transparency sheet and means for attaching said sheet to said strip. An elongated opaque flap is hingedly attached to said strip along a line that extends substantially the entire length of the strip, the line being positioned between and parallel to said line of ring-engagable openings and said elongated area. The flap is hingedly moveable between a closed position covering said elongated area and an open position covering said ring-engagable openings and the adjacent edge of the strip.

In a preferred embodiment, said elongated area of the strip has a line of adhesive that is adapted to attach the strip to a transparency sheet.

The invention also includes an article comprising a ring binder transparency holder having an attached transparency sheet, said holder comprising an elongated, substantially rectangular, ring-engagable strip having two longitudinal edges and a line of ring-engagable openings parallel and adjacent to one of said edges, along the other longitudinal edge a transparency sheet and means for attaching an edge of said transparency sheet to said strip, an elongated opaque flap hingedly attached to said strip along a line that extends substantially the entire length of the strip, the line being positioned between and parallel to said line of ring-engagable openings and said attaching means, said flap being hingedly moveable between a closed position covering a portion of said transparency sheet and an open position covering said ring engagable openings and the adjacent edge of the strip.

THE DRAWINGS

The invention will be further described by reference to the drawings of which FIG. 1 is a plan view of a device of the invention with the opaque flap in the closed position.

DETAILED DESCRIPTION

Figure 1:
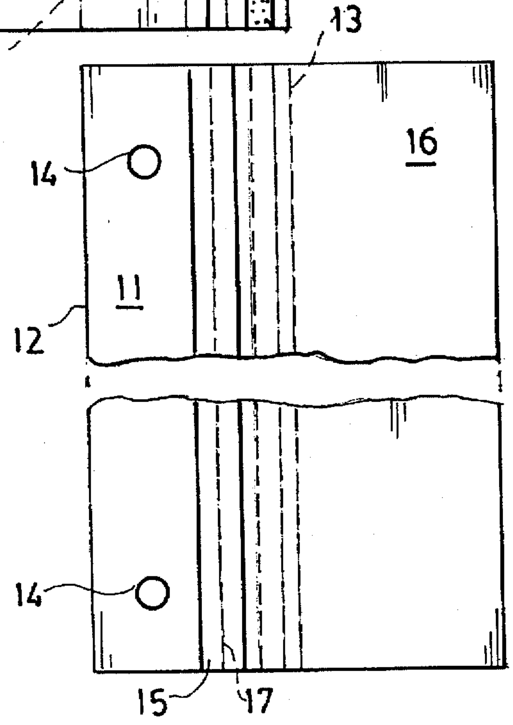

In FIG. 1 the device 10 of the invention comprises an elongated, substantially rectangular, ring-engagable strip 11 having longitudinal edges 12 and 13. Parallel to edge 13 is an elongated area **13*a* of the strip that is adapted to receive the edge of a transparency sheet and means for attaching said sheet to the strip. Parallel to edge 12 is a line of ring-engagable openings or holes 14. Attached to strip 11 by a flexible adhesive tape 15 is a hinged opaque flap 16 extending along substantially the entire length of strip 11. Flap 16 is hingedly movable from the closed position of FIG. 1 to the open position of FIG. 2 along a fold or hinge line 17. Flap 16 preferably is attached to strip 11 by a conventional flexible adhesive tape 15, of paper, fabric, plastic, which functions as a hinge. However, the flap can be attached to the strip by other means such as a line of adhesive, staples or the like which attach to the strip a narrow edge of the sheet from which the flap is formed. In that case the hinge line 17** is simply a longitudinal fold in the flap along the narrow edge attached to the strip.

Figure 2:
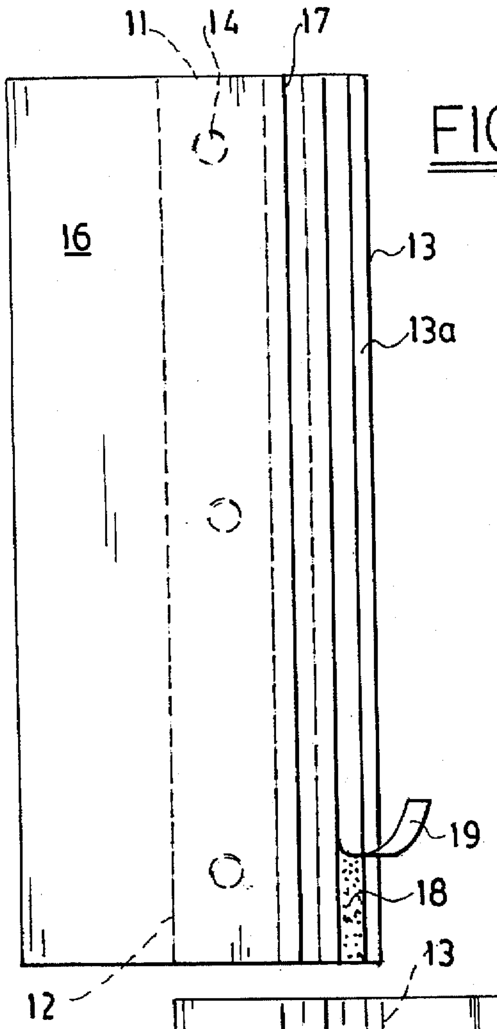
FIG. 2 is a plan view of a device of the invention, with its opaque flap in the open position and with the release strip partially lifted to expose the adhesive.

FIG. 2 illustrates the open position of flap 16. In this position, the flap is folded back along the hinge line 17 to cover the ring-engagable holes 14 and uncover an adhesive line 18 in the elongated area **13*a*, the latter being covered by flap 16 when in the closed position. As shown in FIG. 2 the adhesive line 18, which can be any contact or solvent adhesive, many of which are well-known, can be covered by a release strip 19. The release strip is especially useful if the adhesive is a contact adhesive but is not essential if a solvent adhesive is used. As shown at the lower end of FIG. 2, the adhesive can be exposed by stripping away the release strip 19, which can be of paper, plastic or the like. Upon removal of the release strip, a transparency sheet can be adhered to the holder 10 by pressing an edge of the sheet into contact with the exposed adhesive line 18**.

Figure 3:
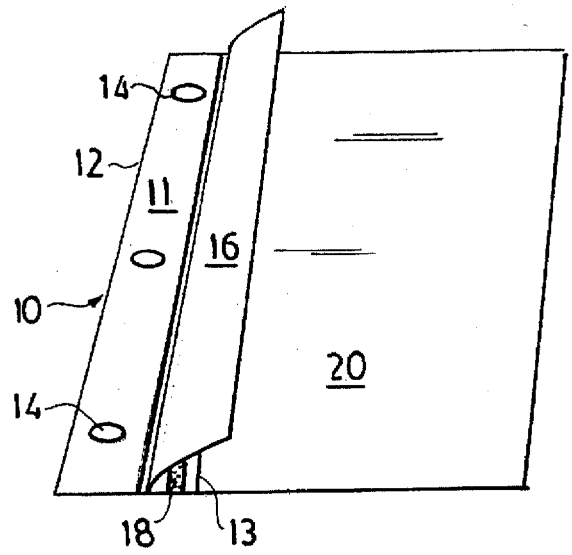
FIG. 3 is a perspective view of an article of the invention with a holder device of the invention having a transparency sheet attached thereto.

FIG. 3 illustrates an article of the invention wherein a holder of the invention is attached to a transparency sheet 20, the flap 16 being partially lifted between the closed and open positions. The transparency sheet 20, which normally would first be imaged in any suitable manner, e.g., by printing in a copying machine or printer, is adhered along one of its longitudinal edges to the holder 10 by the adhesive line 18. If desired, staples or other means for attaching the transparency sheet to the holder 10 can be employed instead of or in addition to an adhesive. The firmly held transparency can be stored in a ring binder notebook by closing flap 16 and engaging holes 14 with the binder notebook rings. For use in an overhead projector, the holder and attached transparency are removed from the ring binder, the transparency is placed on the projection stage of an overhead projector and flap 16 is swung to its open position. In its open position the opaque flap serves to block undesired light along the edge 12 and ring-engagable holes of the holder. It also provides a surface for lecture notes written by the user. Another important advantage of the described transparency holder is that, when attached to a transparency sheet by a removable or releasable contact adhesive, it can be detached and then reused with a different transparency sheet. In another embodiment, an adhesive can be incorporated with the holder which permanently affixes the transparency sheet to the holder. In such an embodiment, once attached, the sheet is not detachable, and the holder may not be reused.

The drawings herein disclose a preferred embodiment of the invention wherein the opaque flap is relatively narrow, being sufficiently wide to cover the ring-engagable holes 14 when in the open position and to provide an area for notes but not to cover the entire transparency when in the closed position. Being narrow, the flap thus performs the necessary functions while economizing in the use of materials. However, the opaque flap can be wider and can cover the entire area of the transparency sheet if desired.

Materials from which the transparencies and holders described herein can be made include conventional plastic, e.g., polyethylene terephthalate, and heavy paper sheet materials such as the materials of the assembly described in U.S. Pat. No. 5,319,400, the disclosure of which is incorporated herein by reference. Thicknesses of the sheet materials can vary considerably, e.g., from about 1 to 5 mils, depending on the stiffness or flexibility desired. The hinged opaque flap 16 preferably has a matte surface which can be written on by pen or pencil.

The invention has been described in detail with particular reference to preferred embodiments thereof, but it will be understood that variations and modifications can be effected within the spirit and scope of the invention.

I claim:

1. A ring binder transparency holder which comprises an elongated, substantially rectangular, ring-engagable strip of sheet material having two longitudinal edges and a line of ring-engagable openings parallel and adjacent to one of said edges, along the other longitudinal edge an elongated area of said strip that is adapted to receive an edge of a plastic transparency sheet and means for attaching said sheet to said strip, an elongated opaque flap hingedly attached to said strip along a line that extends substantially the entire length of the strip, the line being positioned between and parallel to said line of ring-engagable openings and said elongated area, said flap being hingedly moveable between a closed position covering said elongated area and an open position covering said ring engagable openings and the adjacent edge of the strip.

2. A holder according to claim 1 wherein said strip in said elongated area has a line of adhesive that is adapted to adhere the strip to a transparency sheet.

3. A holder according to claim 2 wherein said adhesive is a contact adhesive.

4. A holder according to claim 3 wherein the line of contact adhesive is covered by a release strip.

5. A holder according to claim 1 wherein said flap is attached to said strip by a flexible tape which functions as a hinge.

6. An article comprising a ring binder transparency holder having an attached transparency sheet, said holder comprising an elongated, substantially rectangular, ring-engagable strip having two longitudinal edges and a line of ring-engagable openings parallel and adjacent to one of said edges, along the other longitudinal edge a transparency sheet and means for attaching an edge of said transparency sheet to said strip, an elongated opaque flap hingedly attached to said strip along a line that extends substantially the entire length of the strip, the line being positioned between and parallel to said line of ring-engagable openings and said attaching means, said flap being hingedly moveable between a closed position covering a portion of said transparency sheet and an open position covering said ring engagable openings and the adjacent edge of the strip.

7. An article according to claim 5 wherein said means for attaching is a line of adhesive.

8. An article according to claim 6 wherein said flap is attached to said strip by a flexible tape which functions as a hinge.

* * * * *